(12) United States Patent
van Zessen et al.

(10) Patent No.: US 10,979,775 B2
(45) Date of Patent: Apr. 13, 2021

(54) SEAMLESS SWITCHING FROM A LINEAR TO A PERSONALIZED VIDEO STREAM

(71) Applicant: XITE NETWORKS IP B.V., Amsterdam (NL)

(72) Inventors: Pieter Dirk van Zessen, Amsterdam (NL); Lucas Jules Angelo, Amsterdam (NL); Nikita Kovalchuk, Amsterdam (NL); Roman Ivanov, Amsterdam (NL)

(73) Assignee: XITE NETWORKS IP B.V., Amsterdam (NL)

( * ) Notice: Subject to any disclaimer, the term of this patent is extended or adjusted under 35 U.S.C. 154(b) by 0 days.

(21) Appl. No.: 16/093,676

(22) PCT Filed: Apr. 14, 2016

(86) PCT No.: PCT/EP2016/058291
§ 371 (c)(1),
(2) Date: Oct. 15, 2018

(87) PCT Pub. No.: WO2017/178058
PCT Pub. Date: Oct. 19, 2017

(65) Prior Publication Data
US 2019/0075367 A1    Mar. 7, 2019

(51) Int. Cl.
*H04N 21/6408*   (2011.01)
*H04N 21/2668*   (2011.01)
(Continued)

(52) U.S. Cl.
CPC ..... *H04N 21/6408* (2013.01); *H04N 21/2668* (2013.01); *H04N 21/26258* (2013.01); *H04N 21/4383* (2013.01); *H04N 21/4384* (2013.01); *H04N 21/44008* (2013.01); *H04N 21/44016* (2013.01); *H04N 21/4756* (2013.01);
(Continued)

(58) Field of Classification Search
None
See application file for complete search history.

(56) References Cited

U.S. PATENT DOCUMENTS 9,990,115 B1 *   6/2018   Nijim ................. G06F 16/9535
2002/0122430 A1 *   9/2002   Haberman ....... H04N 21/23614
370/429
(Continued)

FOREIGN PATENT DOCUMENTS

EP       1617669 A2    1/2006

*Primary Examiner* — James R Marandi
(74) *Attorney, Agent, or Firm* — David P. Owen; Hoyng Rokh Monegier LLP

(57) ABSTRACT

Method for receiving video streams (1001, 1003, 1004) from a video server (10) in a client device (20), the video streams comprising a sequence of videos in a binary data format, the method comprising: receiving (101) a linear video stream (1001) from the video server in the client device; receiving (102) a switching signal (1002) from the video server in the client device; and in response to the switching signal, switching (104) from receiving the linear video stream to receiving (105) a personalized video stream (1003) from the video server in the client device, wherein a last video finishes (103) before switching to the personalized video stream, wherein the last video is a video that is being received in the linear video stream when the switching signal is received in the client device.

15 Claims, 4 Drawing Sheets

(51) Int. Cl.

| | |
|---|---|
| *H04N 21/845* | (2011.01) |
| *H04N 21/6405* | (2011.01) |
| *H04N 21/475* | (2011.01) |
| *H04N 21/262* | (2011.01) |
| *H04N 21/438* | (2011.01) |
| *H04N 21/44* | (2011.01) |
| *H04N 21/8358* | (2011.01) |
| *H04N 21/482* | (2011.01) |

(52) U.S. Cl.
CPC ..... *H04N 21/4825* (2013.01); *H04N 21/4826* (2013.01); *H04N 21/6405* (2013.01); *H04N 21/8358* (2013.01); *H04N 21/8456* (2013.01)

(56) References Cited

U.S. PATENT DOCUMENTS

| | | | |
|---|---|---|---|
| 2002/0129374 A1* | 9/2002 | Freeman | H04N 21/4316 725/91 |
| 2010/0223392 A1* | 9/2010 | Pond | H04N 21/4622 709/231 |
| 2013/0042265 A1 | 2/2013 | Copley | |
| 2014/0233912 A1* | 8/2014 | Cansler | H04N 21/458 386/249 |
| 2014/0282695 A1 | 9/2014 | Bakar | |
| 2016/0066038 A1 | 3/2016 | Chesluk | |

* cited by examiner

SEAMLESS SWITCHING FROM A LINEAR TO A PERSONALIZED VIDEO STREAM

FIELD OF THE INVENTION

The present invention relates to video streaming. More specifically, the invention relates to a method for receiving video streams from a video server in a client device, a method for transmitting a personalized video stream from a video server to a client device, a client device, a video server, a video distribution system, and a computer program product.

BACKGROUND

Watching television typically involves linear streaming of a video stream from a head end system to a television set. To the end user this is a passive video viewing experience, meaning that the video content is received in the television set when turned on and no user interaction, other than changing channels, is possible. Receiving linear video streams is not restricted to television sets. Nowadays different kinds of network connected client devices, such as television sets, smart phones, tablets, phablets, set-top boxes, notebooks and computers are capable of receiving linear video streams from a video server. Typically, a linear video stream is broadcast and received by many client devices at the same time.

Video on-demand enables an interactive way of watching videos. With video on-demand the end user chooses the videos to watch through a user interface. A single video may be selected and received or multiple videos may be selected and streamed one after the other to the client device. The kind of client devices can be the same as with linear streaming. To enable an end user to interact with the video server in case of a television set, a smart television or a set-top box capable of running software applications may be used.

There is a need for a hybrid mode of watching video streams, wherein the video stream is received as if a linear video stream, but with the possibility to personalize the linear video stream. Furthermore, if personalization is not possible, e.g. due to capability restriction in the client device, it should still be possible to receive the linear video stream. Ideally, the end user does not see a difference in watching the linear video stream with or without the personalization.

SUMMARY OF THE INVENTION

The present invention enables a client device to switch from a linear video stream to a personalized video stream such that the switch is seamless. I.e, the end user does not notice that the linear stream switches to the personalized stream, resulting in a consistent and good user experience while watching the video streams.

In an aspect of the invention a method is proposed for receiving video streams from a video server in a client device. The video streams can comprise a sequence of videos in a binary data format. The method can comprise receiving a linear video stream from the video server in the client device. The method can further comprise receiving a switching signal from the video server in the client device. The method can further comprise, in response to the switching signal, switching from receiving the linear video stream to receiving a personalized video stream from the video server in the client device. A last video finishes before switching to the personalized video stream, wherein the last video is a video that is being received in the linear video stream when the switching signal is received in the client device.

Thus, advantageously a seamless switch can be made from the linear video stream to the personalized video stream. Client devices that do not support the personalized video stream may continue watch the linear video stream.

The embodiment of claim 2 advantageously enables optimal bandwidth usage through the networks involved in the transmission of the video streams.

The embodiment of claim 3 advantageously helps the client device to determine when to switch such that the switch is seamless.

The embodiment of claim 4 advantageously enables the data pattern to be detectable with minimal required computational power at the video server and at the client device.

The embodiment of claim 5 advantageously enables the data pattern to be detectable without modifying the linear video stream.

The embodiment of claim 6 advantageously enables the switching moment to be determined more accurately.

The embodiment of claim 7 advantageously enables the switching moment to be determined even more accurately.

The embodiments of claims 8-10 advantageously enable the personalized video stream capabilities to be started only when potentially needed. Quickly changing between linear video streams (e.g. 'zapping' using a remote control) will thus not result in the personalized video stream capabilities to start.

The embodiment of claim 11 advantageously enables remote control interaction for personalizing the personalized video stream.

The embodiment of claim 12 advantageously enables the selection of videos in the personalized video stream to be dependent on the user input.

According to an aspect of the invention a method is proposed for transmitting a personalized video stream from a video server to a client device. The personalized video stream can comprise a sequence of videos in a binary data format. The sequence of videos scheduled for transmission can be stored at the video server as a playlist. The method can comprise receiving an indication of a video related user input from the client device, wherein the video related user input can be related to a current video in the personalized video stream and received in the client device via a user interaction with the client device. The indication of the video related user input can result in a scoring of the current video. The method can further comprise changing one or more videos in the playlist in response to the video related user input and based on the scoring. The indication of the video related user input can comprise one or more of: an indication of the user pressing a like button resulting in a higher scoring; an indication of the user pressing a 'skip to next video' button within a predefined amount of time from the beginning of the video resulting in a lower scoring depending on the amount of time; and an indication of the user pressing a volume button resulting in a higher scoring in case of a volume up or a lower scoring in case of a volume down.

The embodiment of claim 14 advantageously enables a scoring not based on user input.

The embodiments of claims 15 and 17 advantageously enable a real time or near real time (i.e. before the current video finishes) updating of the playlist.

The embodiment of claim 16 advantageously enables a sophisticated ranking of videos and selection of videos based on this ranking.

The embodiment of claim 18 advantageously enables particular videos to be forced to watch.

According to other aspects of the invention a client device, a video server and a video distribution system are proposed having one or more of the above described features.

According to an aspect of the invention a computer program product is proposed for performing the method as described above for the video server.

Hereinafter, embodiments of the invention will be described in further detail. It should be appreciated, however, that these embodiments may not be construed as limiting the scope of protection for the present invention.

BRIEF DESCRIPTION OF THE DRAWINGS

Aspects of the invention will be explained in greater detail by reference to the drawings, in which.

DETAILED DESCRIPTION

In between the linear video streaming experience on the one hand and the video on-demand on the other hand, in the present invention a personalized video streaming is made possible. With personalized video streaming a video stream is streamed to the client device, as in linear streaming, but user interaction is possible to influence what videos are part of the video stream. Alternatively or additionally the end user may select videos as in video on-demand services, which videos will then be included in the personalized video stream. Personalized video streams are typically unicast from a video server to a client device.

Personalized video streaming requires that the client device is capable of processing user input for selecting or influencing the videos in the personalized video stream. As not all client devices will be capable of such user interaction, the present invention enables receiving of a linear video stream first and only if the client device is capable of receiving personalized video streams the client device will switch to this mode of operation.

For example, in case of a television service provider having a client base with a mix of older and newer versions or models of set-top boxes, the older set-top boxes may be capable of receiving linear video streams only, while the newer set-top boxes are also capable of user interaction. Using the older set-top box the end user will be able to watch a linear video stream and change channels to switch to other linear video streams, if applicable. A newer set-top box initially operates as an older set-top box, i.e. it starts receiving the linear video stream. If a personalized video stream is available for the channel being watched, the set-top box can switch to the personalized video stream. According to the invention this switch is made seamless, i.e. there is no abrupt switch from the linear feed to the personalized feed but instead the video in the linear feed is received until it finishes and only then the switch is made. An end user watching the video stream may not even notice that the switch has been made.

Figure 1:
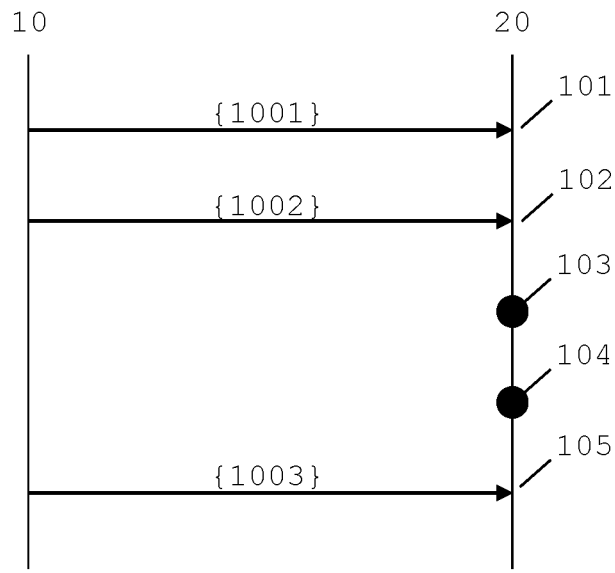
FIG. 1 shows a time sequence diagram of an exemplary embodiment of the invention.

FIG. 1 shows an exemplary embodiment of the invention wherein a seamless switch is made from a linear video stream to a personalized video stream. FIG. 1 shows a time-sequence diagram with data being transmitted between a video server 10 and a client device 20. Initially the linear video stream {1001} is received in the client device 20, denoted as 101. The video server 10 in the backend controls the switching to the personalized stream. Hereto, a switching signal {1002} is transmitted to the client device 20, which is received as denoted 102. The switching signal {1002} contains information that is used by the client device 20 to determine 103 when the last video to be displayed from the linear video stream finishes, thus when the seamless switch 104 to the personalized video stream can be made. When the switch is made, the personalized video stream is received in the client device 20.

Figure 2:
FIG. 2 shows a linear video stream of an exemplary embodiment of the invention.

To determine the boundaries of the videos, a data pattern may be included in the linear video stream. The data pattern may be embedded in a video of the video stream, e.g. as a watermark within a video frame of a video channel or within an audio channel of the video. An embedded data pattern requires the video server to be capable of inserting the data pattern into the video and the client device to extract the data pattern from the video again, which requires relatively high computational power. Therefore, preferably the data pattern is transmitted as a data pattern P in between two videos of the video stream, as shown in FIG. 2. Preferably, the data pattern is invisible to the end user while the linear video stream is being displayed.

Alternatively, the boundaries may be detected through pattern recognition. The video server 10 analyzed the videos, e.g. at predefined intervals of 1 or 2 seconds, for specific characteristics like saturation, black levels, volume levels, or any other characteristics that can be obtained from each video, and stores these characteristics as characteristics data prior to transmission of the video in the linear video stream. The client device 20 also analyzes the linear video stream as it is received to generate received characteristics data. In this case the pattern data is defined to be the characteristic elements within the video that are obtainable through analyzing the video. The characteristics data stored at the video server and the received characteristics data from the client device are then compared and matched to determine if the video has been received in the client device 20. The comparison and matching is typically performed at the video server, possibly in a computer connected to the video server. Hereto the received characteristics data is transmitted from the client device 20 to the video server 10.

In FIG. 2 an exemplary linear video stream 1001 is shown containing a sequence of videos $\{V_{Li}, \ldots, V_{Lj}, \ldots, V_{Lk}, \ldots\}$. A data pattern P is included before video $V_{Lj}$, which will be the last video to be displayed on the client device. Note that after the switch the linear video stream continues to be broadcast and possibly received by other client devices. The linear video stream may include a switching signal in the form of a data pattern before each video in the linear video stream.

Figure 4:
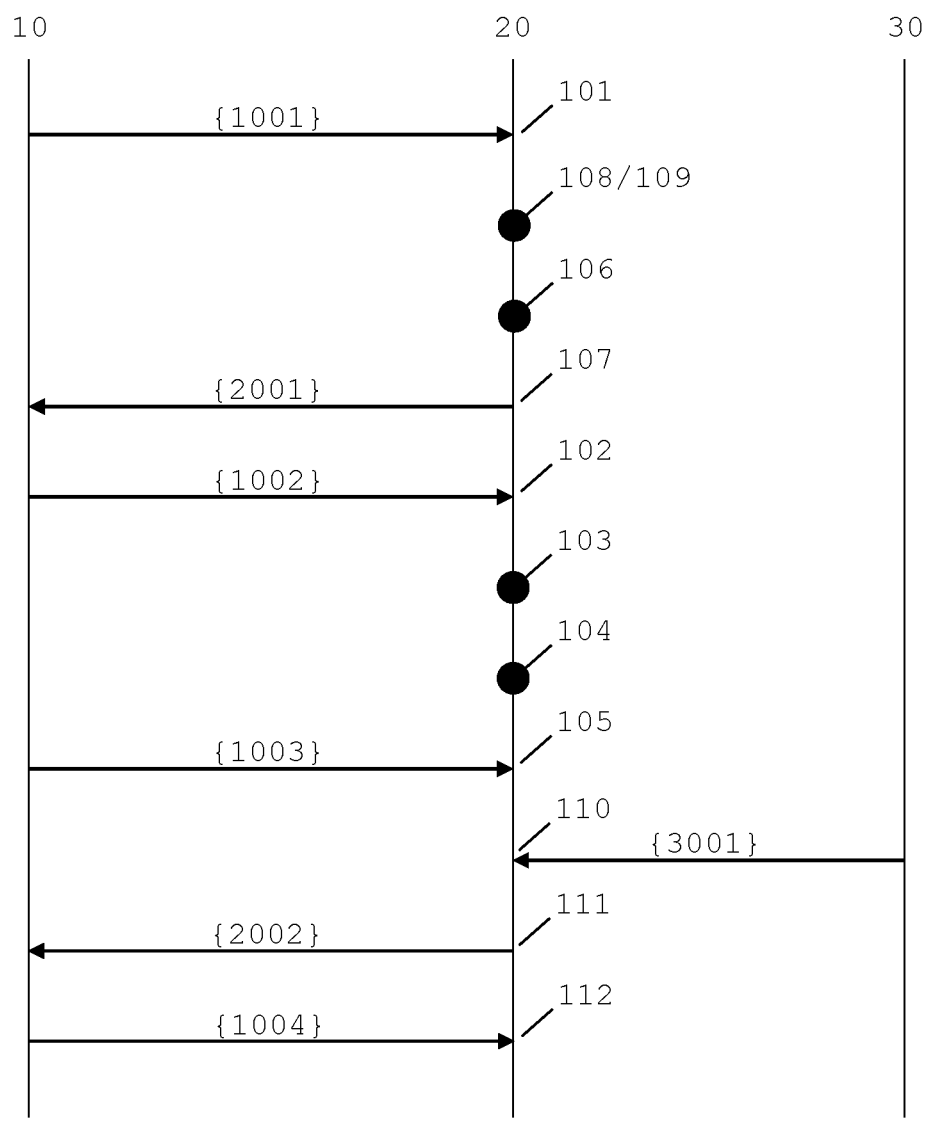
FIG. 4 shows a time sequence diagram of an exemplary embodiment of the invention.

In the exemplary embodiment of FIG. 4 the steps of FIG. 1 are included and additional optional operations are shown.

As indicated above, the client device 20 may trigger the video server 10 that it can receive a personalized video stream. In step 106 the client device 20 detects the data pattern, e.g. the data pattern P shown in FIG. 2 or the characteristic elements within the video. In response, the client device 20 transmits a trigger signal {2001} to the video server 10, as denoted 107, which triggers the video server 10 to generate and transmit the switching signal {1002} to the client device 20. The switching signal {1002} may be in any format, such as a binary coded message, XML message, HTTP request or json message.

In order to have a seamless switch from the linear video stream {1001} to the personalized video stream {1003}, the switching signal {1002} may include timing data indicative of when the last video $V_{Lj}$ finishes. Examples of timing data are an absolute time at which to switch or a timer value which has to lapse before switching.

Timers for acquiring the current time in the video server 10 and in the client device 20 may be out of sync, in which case the timing data as described above may result in an incorrect moment of switching to the linear video stream {1003}. To overcome this problem, the client device 20 may include a time stamp in the trigger signal {2001} indicative of the time of receipt of the data pattern in the client device 20, thus indicative of the start time of the last video $V_{Lj}$ at the client device 20. Alternatively or additionally, the trigger signal {2001} includes the received characteristics data as obtained in the client device 20, from which the video server 10 can derive the start time of the last video $V_{Lj}$ at the client device 20.

The video server 10 knows the start time of the last video as transmitted to the client device 20 and compares this start time with the start time as received from the client device 10 to determine a time offset. Furthermore, any delays caused by the transmission path in between the video server 10 and client device 20 are accounted for in the time offset. The switching signal {1002} then includes a time at which the client device 20 is to switch to the personalized video stream, which is set at the start time of transmission of the last video to the client device added with the duration of the last video as known in the video server and added with the time offset. Or mathematically:

t1=server time of start of last video;
t2=client time of start of last video (P detection);
time offset=t1−t2;
switch time=t1+duration last video+time offset The processing of the switching signal {1002}, the capability of receiving the personalized video stream {1003} and the detection of the data pattern P are typically implemented in a software application, computer program or app running on the client device. This software application may be started automatically, denoted 108 in FIG. 4, when the linear video stream is received, typically after a predefined amount of time after tuning in to the channel of the linear video stream. Alternatively, the software application may be started in response to an instruction thereto from the end user, denoted 109, e.g. by pressing a button on the client device 20 or on a remote control 30 controlling the client device 20.

An important feature of personalized video streaming is the capability of receiving user input that influence which videos are included in the personalized video stream. User interaction may be enabled directly on the client device, e.g. through buttons, keyboard or touch screen, and/or using a remote control device. In FIG. 4 an exemplary remote control device 30 is used to give video related user input {3001} to the client device 20.

Figure 3:
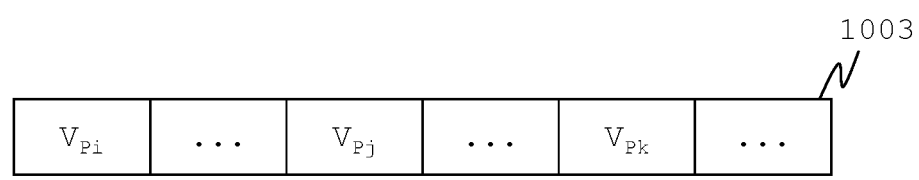
FIG. 3 shows a personalized video stream of an exemplary embodiment of the invention.

Video related user input {3001} is user input that is related to the current video being received and displayed. FIG. 3 shows an exemplary personalized video stream 1003 containing a sequence of videos {$V_{Pi}$, . . . , $V_{Pj}$, . . . , $V_{Pk}$, . . . }. In the present example video $V_{Pj}$ is the current video being received. While watching the current video $V_{Pj}$, the end user may indicate whether he or she likes the current video or not. Hereto, the user may operate a like button. Note that buttons such as the like button may be physical buttons or a software implemented buttons displayed on a display. The user pressing a 'skip to next video' button within a predefined amount of time from the beginning of the video can be indicative of not liking the video. The user pressing a volume button can be indicative of liking the video in case of a volume up or disliking the video in case of a volume down.

The video related user input {3001} is received in the client device, as denoted 110 in FIG. 4. An indication {2002} of the video related user input, e.g. in the form of a binary coded, XML, HTTP or json message, is transmitted to the video server in step 111.

Based on the user input, the video server 10 changes one or more videos in the personalized video stream and continues to transmit the personalized video stream {1004} containing the newly selected videos.

Another indication of the end user liking a video can be the current video being received and displayed in its entirety. This may be detected in the video server 10 or in the client device 20 and reported to the video server 10, and influence the selection of future videos in the personalized video stream.

Figure 6:
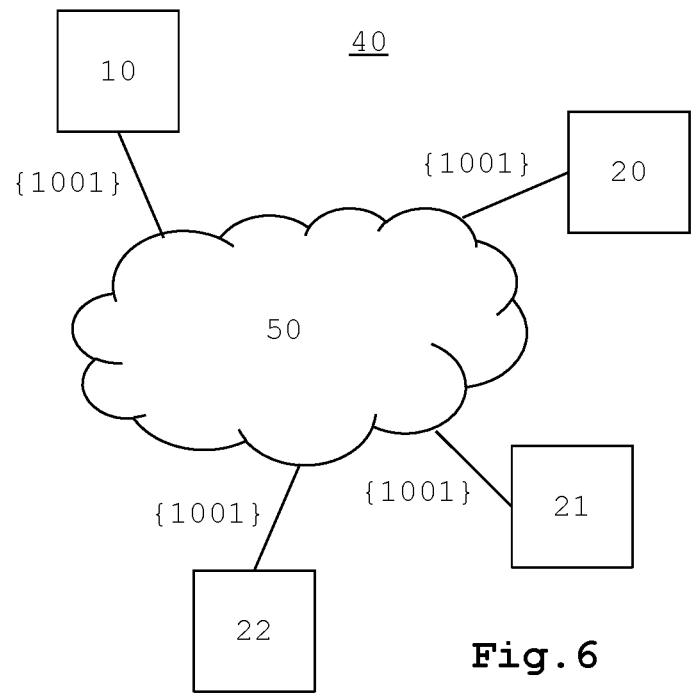
FIG. 6 shows a network architecture of an exemplary embodiment of the invention.
Figure 7:
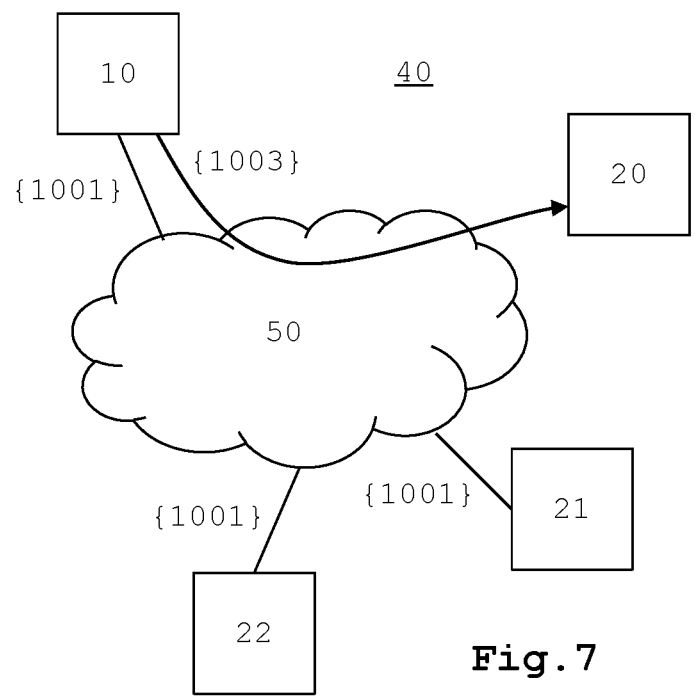
FIG. 7 shows a network architecture of an exemplary embodiment of the invention.

FIG. 6 and FIG. 7 show an exemplary, simplified video distribution system 40, wherein a video server 10 broadcasts a linear video stream {1001} to a plurality of client devices 20-21 via a data network 40. Note that there can many client devices, possibly millions. After switching to the personalized video stream {1003}, client device 20 only receives the personalized video stream {1001} while the other devices 21, 22 keep receiving the linear video stream {1001}.

As described above, the video server 10 selects the videos in the personalized video stream based on the video related user input. Hereto the available videos at the video server are scored, which means that ranking points are assigned to the videos for each user.

Typically, the actual videos are stored separately from the scoring information. Videos can be stored at mass storage locations with high bandwidth capabilities, while scoring information and other information like meta data of the videos can be stored in databases at other locations. The video server 10 may be implemented as a cluster of servers and/or a plurality of servers with different functions. One or more of the servers may be implemented in a cloud environment.

The videos in the personalized video stream are typically prepared in the video server 10 as playlists. The user interaction indicative of liking or disliking of videos results in the videos getting a different score. The selection and changing of the videos in the playlist is based on the scoring of the videos for the current user. For example: the indication of the user pressing a like button typically results in a higher scoring; an indication of the user pressing a 'skip to next video' button within a predefined amount of time from the beginning of the video typically results in a lower scoring depending on the amount of time; and an indication of the user pressing a volume button typically results in a higher scoring in case of a volume up or a lower scoring in case of a volume down.

When a score of the current video is changed as a result of the user input, then all available videos at the video server 10 are be ranked. The ranking typically takes into account the scores and weight factors assigned to the videos. The weight factors are used to give particular videos a higher or lower ranking, e.g. based on general popularity of a video. Alternatively or additionally the weight factors can be related to specific meta data to enable successive videos in the playlist to have commonalities based on the meta data by taking into account the weight factors.

For example, assume that the following meta data have the following weight factors:
Artist name: weight=15;
Related artist link: weight=13;
Era: weight=3;
Energy: weight=8;
Genre: weight=12.

In the selection of a subsequent video in the playlist the artist name thus has the highest weight factor, increasing the chance that the next video will be from the same artist. Similarly the other meta data will be processed.

The scoring that is stored with each song for the current user may be multiplied or added with the weight factors, depending on the logic, to determine the ranking of each video. One or more of the highest ranked videos can then be selected for inclusion in the playlist.

Separation rules may be applied to videos, e.g. defining that a user interaction being a skip results in the artist of the current video not to be selected for 1800 seconds in the playlist. Thus, videos can be separated by a predefined amount of time depending on the user interaction and depending on meta data fields.

Groups of related videos may be defined. These videos may be related based on any meta data or other rules. For these related videos a specific rule may be applied re the selection of videos for the playlist. An end user may be forced to watch at least one of the related videos until the end before seeing another video. Hereto, a user interaction resulting in a negative scoring will result in the next video on the playlist being selected from the group of related videos.

The scoring and ranking is preferably performed in real time, which means that during the transmission of the current video all the calculations and the updating of the playlist finishes, enabling the next video after the current video to be from the updated playlist.

Figure 5:
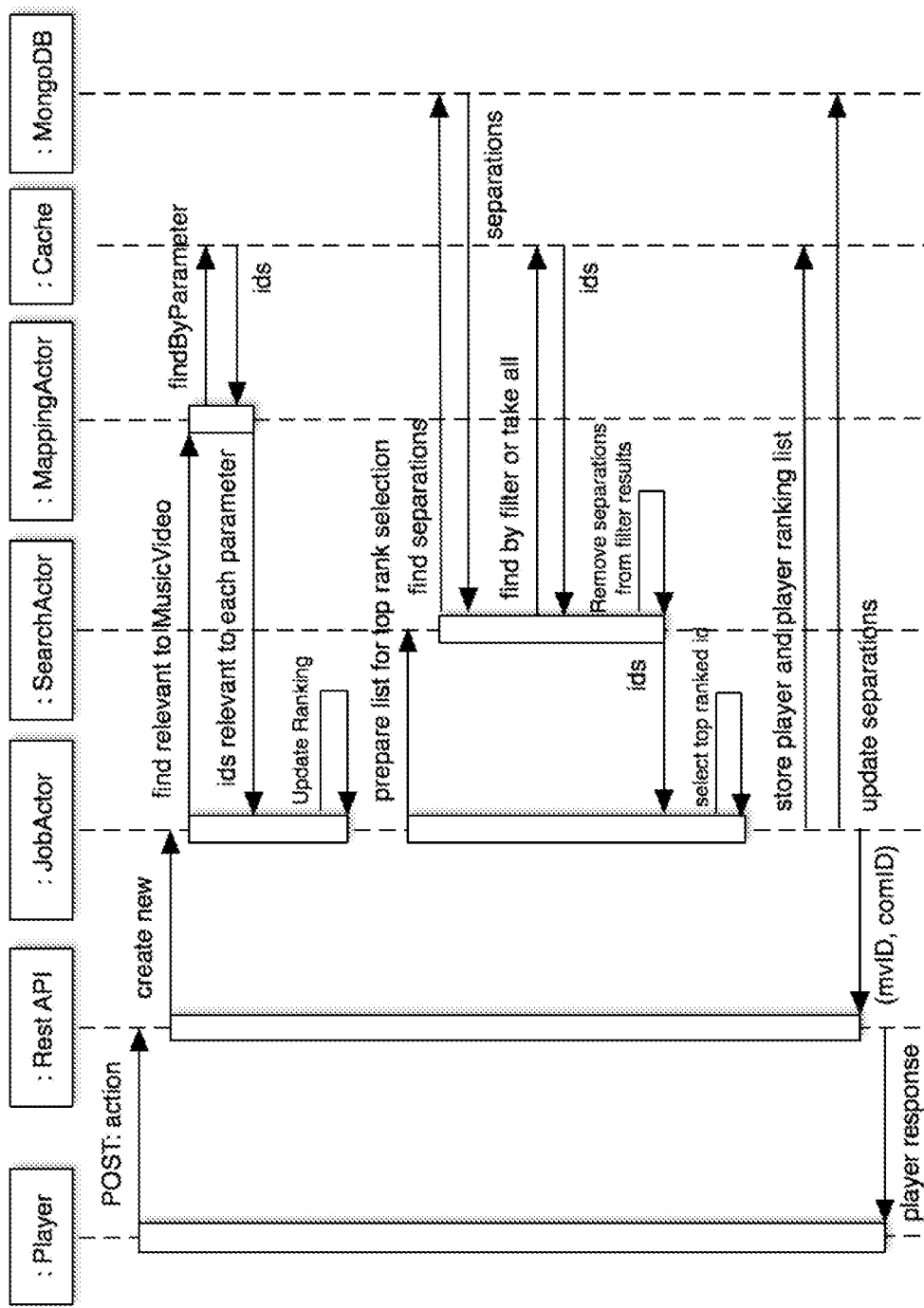
FIG. 5 shows a time sequence diagram of an exemplary embodiment of the invention.

FIG. 5 shows an exemplary embodiment of how the video server 10 may process the scoring information and perform the ranking for updating the playlist in real time. On every Action Request there is a dedicated JobActor created which manages computational flow. Rest API creates a new JobActor and sends ASK (synchronous Akka request) JobRequest to the JobActor. JobActor then performs the following tasks in async and parallel way: (1) JobActor spawns MappingActor and gives it MusicVideo which is being processed now. MappingActor sends back to JobActor 11 ids batches which correspond to all videos relevant current by its parameters; (2) on each of the 11 BatchRankingRequest(ids,weight), JobActor updates current ranking; (3) JobActor sends SearchRequest to SearchActor to get the list of ids which will be used to select top ranking video. This list is formed from either filtered of filter is defined for player or for all music videos and removed all ids which are in player separation list; (4) when SearchResult arrived, JobActor stored it and checks if all updates are already made. If yes, top ranking is calculated for SearchResult; (5) after top ranked video is found, response is sent immediately to Rest API and, in background, ranking list and player is saved to the cache. Note that the whole flow of FIG. 5 can be done in parallel and may only check when all required data is present to do the operation.

One embodiment of the invention may be implemented as a program product for use with a computer system, such as a television set, smart phone, tablet, phablet, set-top box, notebook or computer. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., hard-disk drive or any type of solid-state random-access semiconductor memory or flash memory) on which alterable information is stored. Moreover, the invention is not limited to the embodiments described above, which may be varied within the scope of the accompanying claims.

The invention claimed is:

1. Method for receiving video streams from a video server in a client device, the video streams comprising a sequence of videos in a binary data format, the method comprising:
receiving a linear video stream from the video server in the client device;
receiving a switching signal from the video server in the client device; and
in response to the switching signal, switching from receiving the linear video stream to receiving a personalized video stream from the video server in the client device,
wherein a last video to be displayed from the linear video stream finishes before switching to the personalized video stream by displaying the last video in the linear video stream at the client device up to a boundary of the last video,
wherein the personalized video steam comprises a sequence of videos from a playlist stored in the video server, and wherein the sequence of videos in the playlist is changeable through a user interaction with the client device.

2. The method according to claim 1, wherein the linear stream is broadcast to a plurality of client devices including said client device, and wherein the personalized video stream is unicast to said client device.

3. The method according to claim 1, wherein the linear video stream comprises a data pattern, and wherein the data pattern is detected and used by the client device to determine when the last video finishes by determining the boundary from the data pattern.

4. The method according to claim 3, wherein the data pattern is transmitted in between two videos in the linear video stream, wherein preferably the data pattern is humanly unperceivable, and wherein preferably the data pattern is transmitted in a video channel or an audio channel in the linear video stream.

5. The method according to claim 3, wherein the data pattern comprises characteristic elements within the video that are obtainable through analyzing the video.

6. The method according to claim 3, wherein the client device transmits a trigger signal to the video server in response to detection of the data pattern, wherein the switching signal is received in response to the trigger signal, and wherein the switching signal comprises timing data indicative of when the last video in the linear video stream finishes.

7. The method according to claim 6, wherein the trigger signal comprises:
a first time stamp indicative of a time of receipt of the data pattern in the client device; and/or
characteristics data indicative of characteristic elements within the video from which the first time stamp is derivable at the video server, and wherein the timing data is generated in the video server using the first time stamp, a second time stamp indicative of a time of transmission of the data pattern from the video server and a duration of the last video in the linear video stream.

8. The method according to claim 3, wherein the linear video stream includes the switching signal in the form of the data pattern.

9. The method according to claim 1, wherein the user interaction and the personalized stream are processed by a computer program running on a processor in the client device, and wherein the client device receives the linear stream before starting the computer program.

10. The method according to claim 9, wherein the computer program is started automatically at a predefined amount of time after first receiving the linear stream.

11. The method according to claim 9, wherein the computer program is started upon receiving a user input in the client device.

12. The method according to claim 11, wherein the user input is received from a remote control device for controlling the client device.

13. The method according to claim 9, further comprising:
receiving a video related user input with the user interaction, the video related user input being related to a current video, wherein the current video is a video that is being received in the personalized video stream when receiving the video related user input;
transmitting an indication of the video related user input to the video server; and
receiving the personalized video stream from the video server, wherein one or more videos in the personalized video stream are selected by the video server based on the video related user input.

14. A client device configured for receiving video streams from a video server, the video streams comprising a sequence of videos in a binary data format, wherein the client device is adapted to:
receive a linear video stream from the video server in the client device;
receive a switching signal from the video server in the client device; and
in response to the switching signal, switch from receiving the linear video stream to receiving a personalized video stream from the video server in the client device,
wherein a last video to be displayed from the linear video stream finishes before switching to the personalized video stream by displaying the last video in the linear video stream at the client device up to a boundary of the last video,
wherein the personalized video steam comprises a sequence of videos from a playlist stored in the video server, and wherein the sequence of videos in the playlist is changeable through a user interaction with the client device.

15. A video distribution system comprising a video server and one or more client devices according to claim 14, wherein the video server and the one or more client devices are coupled via a data network.

* * * * *